United States Patent [19]
Pawlowicz et al.

[11] Patent Number: 5,468,327
[45] Date of Patent: Nov. 21, 1995

[54] METHOD AND DEVICE FOR CONTINUOUS FORMATION OF BRAID REINFORCED THERMOPLASTIC STRUCTURAL AND FLEXIBLE MEMBERS

[75] Inventors: Andrew Pawlowicz, Midland, Mich.;
Craig Douglas, Lexington; Amad Tayebi, Westford, both of Mass.;
Stephen Orroth, Windham, N.H.

[73] Assignee: University of Massachusetts Lowell, Lowell, Mass.

[21] Appl. No.: 186,451

[22] Filed: Jan. 24, 1994

[51] Int. Cl.⁶ ............................ B29C 70/34; D04C 3/00
[52] U.S. Cl. ............................ 156/393; 87/23; 87/34; 87/35; 156/498; 156/500; 156/537; 425/71; 425/89; 425/114; 425/384; 425/509
[58] Field of Search .................... 156/148, 149, 156/289, 393, 441, 498, 500, 537; 264/103, 136, 166, 173; 87/1, 8, 9, 23, 34, 35; 425/112, 114, 71, 89, 509, 384, 393

[56] References Cited

U.S. PATENT DOCUMENTS

| | | | |
|---|---|---|---|
| 787,383 | 4/1905 | Klein | 87/34 |
| 2,810,424 | 10/1957 | Swartswelter et al. | 156/393 |
| 3,079,978 | 3/1963 | Cobb, Jr. et al. | 156/441 |
| 3,255,614 | 6/1966 | Kemmnitz | 66/192 |
| 4,010,054 | 3/1977 | Bradt | 156/173 |
| 4,260,143 | 4/1981 | Kliger | 267/148 |
| 4,380,483 | 4/1983 | Kliger | 156/169 |
| 4,494,436 | 1/1985 | Kruesi | 87/23 |
| 4,626,306 | 12/1986 | Chabrier et al. | 156/180 |
| 4,640,681 | 2/1987 | Steinbiss et al. | 432/14 |
| 4,640,861 | 2/1987 | Binnersley et al. | 428/294 |
| 4,719,837 | 1/1988 | McConnell et al. | 87/1 |
| 4,891,179 | 1/1990 | Peacock et al. | 425/112 |
| 4,976,812 | 12/1990 | McConnell et al. | 156/393 |
| 5,006,291 | 4/1991 | Fish | 264/103 |
| 5,146,835 | 9/1992 | McConnell et al. | 87/1 |
| 5,176,775 | 1/1993 | Montsinger | 156/181 |
| 5,192,383 | 3/1993 | Cavin | 156/180 |
| 5,340,299 | 8/1994 | Jarvenkyla et al. | 425/384 |

FOREIGN PATENT DOCUMENTS

| | | | |
|---|---|---|---|
| 57-71107 | 5/1992 | Japan | H01F 5/06 |
| 262377 | 5/1970 | U.S.S.R. | 425/114 |
| 2113140 | 8/1982 | United Kingdom | B29D 3/02 |

*Primary Examiner*—Steven D. Maki
*Attorney, Agent, or Firm*—Hamilton, Brook, Smith & Reynolds

[57] ABSTRACT

A braided fiber reinforced thermoplastic member is formed by a device, which comprises a braiding device for weaving thermoplastic coated fibers with second fibers onto a weaving mandrel for form a braided preform, and a heating die for melting the thermoplastic of the coated fibers of the braided preform to form a continuous matrix of thermoplastic between the coated fibers and the second fibers. A method for forming a fiber reinforced thermoplastic member comprises coating carbon fibers with a thermoplastic melt, cooling the thermoplastic coated carbon fibers, braiding the coated carbon fibers onto a weaving mandrel with Kevlar® bias fibers to form a braided preform, and drawing the braided preform through a heating die.

13 Claims, 8 Drawing Sheets

5,468,327

METHOD AND DEVICE FOR CONTINUOUS FORMATION OF BRAID REINFORCED THERMOPLASTIC STRUCTURAL AND FLEXIBLE MEMBERS

BACKGROUND OF THE INVENTION

In certain applications, composite materials have been replacing steel and aluminum alloys. These materials, generally comprising carbon fiber, can have strength characteristics similar to steel or aluminum alloys but be substantially lighter in weight. Moreover, these composites, if treated properly, will not fatigue as will metals.

Various methods and devices for forming rigid composite structures from resins and carbon fibers have been proposed. In most instances, these composite structures are formed from woven fibers set in a thermoset epoxy resin. In other applications, thermoplastics are used in place of the thermosets.

SUMMARY OF THE INVENTION

In the present invention, braided fiber reinforced thermoplastic members are formed by a device, which comprises a braiding device for weaving coated fibers with second fibers onto a weaving mandrel to form a braided preform and a heating die for melting the thermoplastic of the coated fibers of the braided preform to form a continuous matrix of thermoplastic between the coated fibers and the second fibers.

An apparatus for forming a braid reinforced thermoplastic member comprises:

a weaving mandrel;

means for supporting the weaving mandrel such that the weaving mandrel is stationary;

a braiding device for weaving fibers coated with thermoplastic with second fibers onto the weaving mandrel to form a braided preform;

a heating die for melting the thermoplastic of the coated fibers of the braided preform to form a continuous matrix of thermoplastic between the coated fibers and the second fibers to produce the member; and a cooling bath for receiving and cooling the member exiting from the heating die;

wherein the weaving mandrel extends through the heating die and into the cooling bath and includes:

a center bore formed therein, a fluid tube in the bore of the weaving mandrel for conveying a cooling fluid into the mandrel, and a plug, sealing the center bore of the weaving mandrel, for restricting circulation of the cooling fluid from a portion of the mandrel within the heating die.

Also the present invention is directed to a method for forming the fiber reinforced thermoplastic member per se. The method comprises coating carbon fibers with a thermoplastic melt, cooling the thermoplastic coated carbon fibers, braiding the coated carbon fibers onto a weaving mandrel with Kevlar® bias fibers to form a braided preform, and drawing the braided preform through a heating die.

The present invention anticipates and solves a number of problems associated with previously known devices. For example, an extrusion coating die within the device achieves adequate coating of carbon fibers with thermoplastic prior to weaving the braided preform. Further, of the axial and bias fibers which form the braided member, only the axial yarns need to be coated with thermoplastic prior to weaving. Moreover, a combination of a mandrel and heating die are used downstream of a braider to melt the thermoplastic to form a rigid member. This combination of the mandrel and heating die ensure adequate impregnation of the thermoplastic into the axial and bias yarns. Still further, the combination of the mandrel and heating die allow for members with different cross sections to be formed. Still additionally, the structure and design for a stationary mandrel, on which the braided member is formed, is disclosed, which enables direct formation of hollow braided members.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed and various and numerous embodiments without the departing from the scope of the invention.

DETAILED DESCRIPTION OF THE INVENTION

Figure 1:
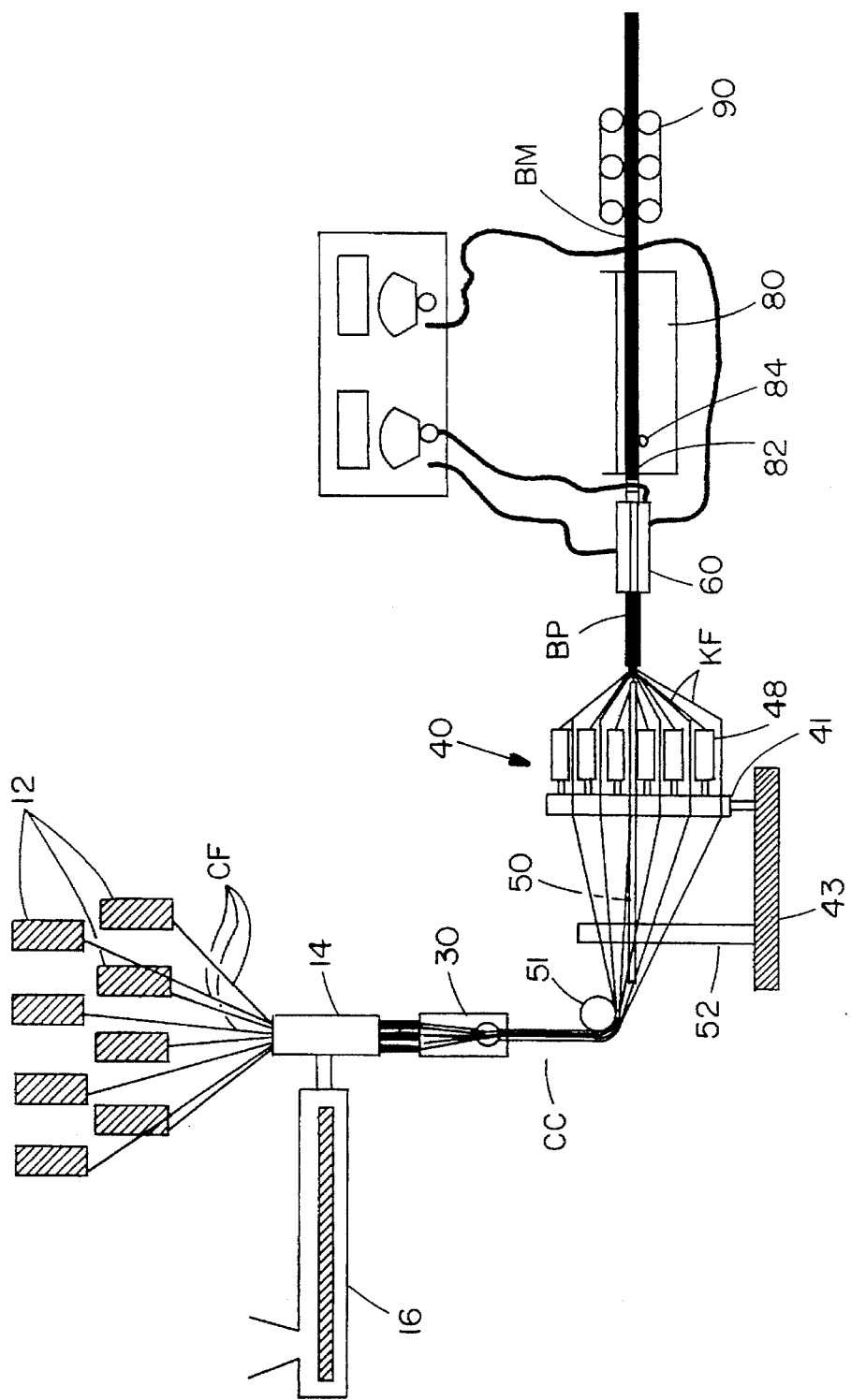
FIG. 1 schematically illustrates the apparatus for forming the braided fiber reinforced thermoplastic members.

In the figures generally, an apparatus and method for forming braid reinforced thermoplastic structural members constructed according to the principles of the present invention are illustrated. More specifically in FIG. 1, an apparatus is shown in which unidirectional multifilament carbon fiber bundles CF are paid-off supply rolls 12 and coated with thermoplastic resin, ideally polyester, by cross-fed mandrel extrusion coating dies 14. An extruder 16 melts solid thermoplastic resin and provides the liquid resin under pressure to the extrusion coating dies 14, each of which individually coats one of the carbon fiber bundles CF.

Figure 2:
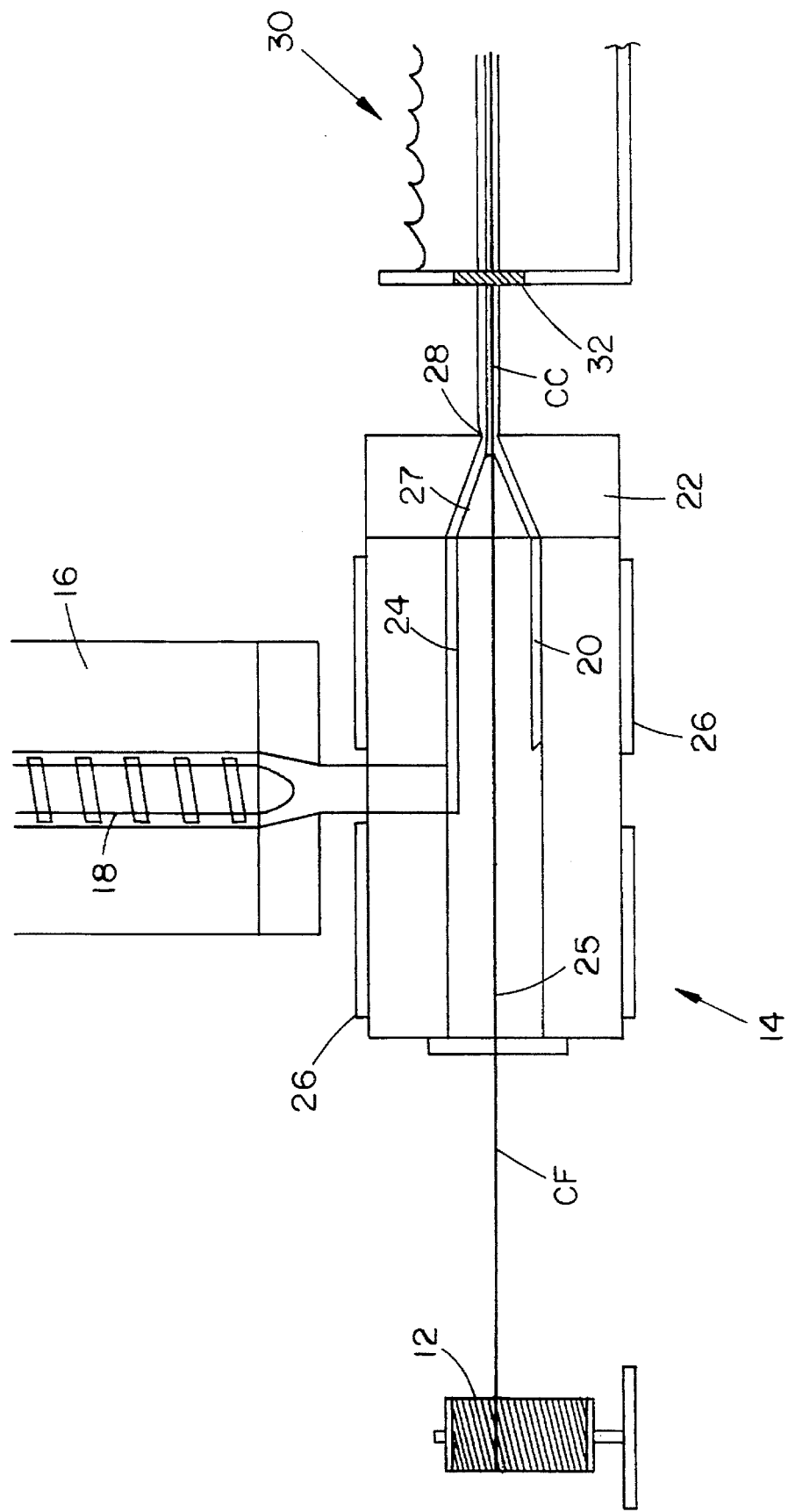
FIG. 2 illustrates a cutaway view of a cross-feed extrusion coating die.

FIG. 2 illustrates a detailed cut away view of a proximal end of the extruder 16 and one of the extrusion coating dies 14 used to coat a single carbon fiber bundle CF. Head pressure generated by screw 18 injects the molten thermoplastic into the extrusion coating die, i.e., an annular slit 20 formed between a die body 22 and die mandrel 24, from the side. Simultaneously, the carbon fiber bundle CF is drawn off the payoff roll 12 through an axial bore 25 formed through the die mandrel 24 and opening at a conical tip 27. The die body 22 and die mandrel 24 are heated by heater bands 26 so that the uncoated carbon fiber bundle CF in the axial bore 25 is preheated increasing its surface reactivity. The heater bands 26 also maintain the temperature of the advancing thermoplastic melt in the extrusion coating die 14.

Figure 3:
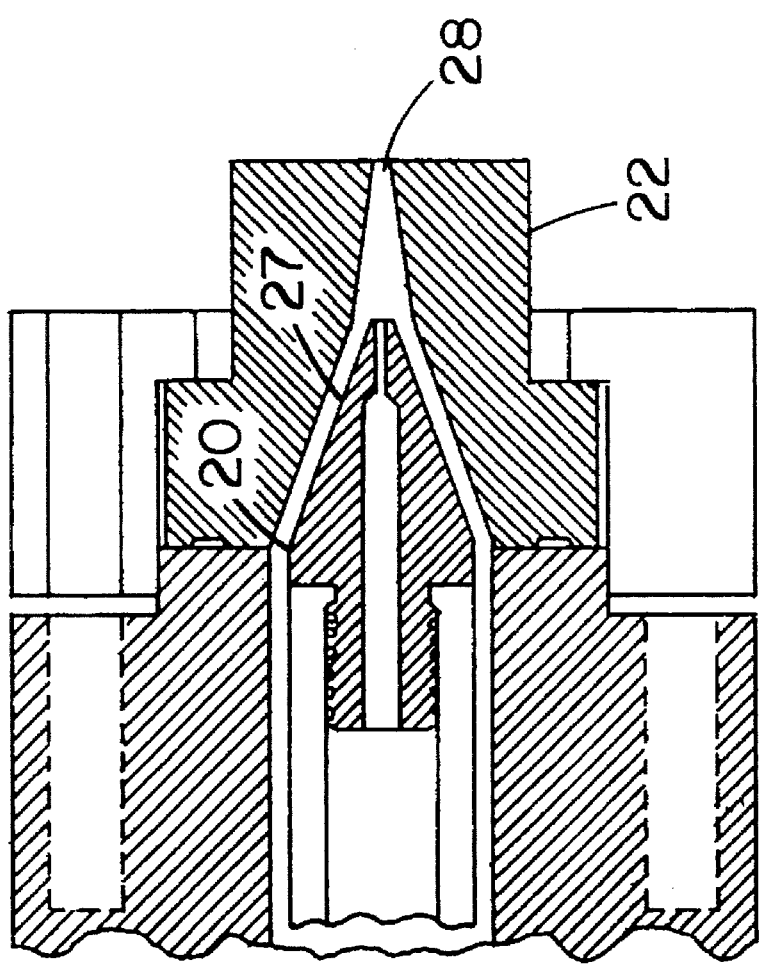
FIG. 3 is a cross-sectional view of the nozzle end of the cross feed extrusion coating die.

In the downstream direction, the diameter of the annular slit 20 lessens due to the conical tip 27 of the die mandrel 24 and the converging inner walls of the die body 22. Consequently, the advancing thermoplastic melt is directed toward the carbon fiber bundle CF emerging from the axial bore 25, which picks up thermoplastic resin in the region between the conical tip 27 and the outer die orifice 28 before exiting the outer die orifice. FIG. 3 is a detailed cross sectional view of the downstream end of the coating die 14 and the conical tip 27.

Returning back to FIG. 2, as each coated carbon fiber bundles CC exits its corresponding the extrusion coating die 14, they enter a first cooling bath 30 through a first squeegee water dam 32. The direct entrance into the first cooling bath 30 provides even cooling without any differential cooling along any cross-section of the coated fibers CC.

Figure 4:
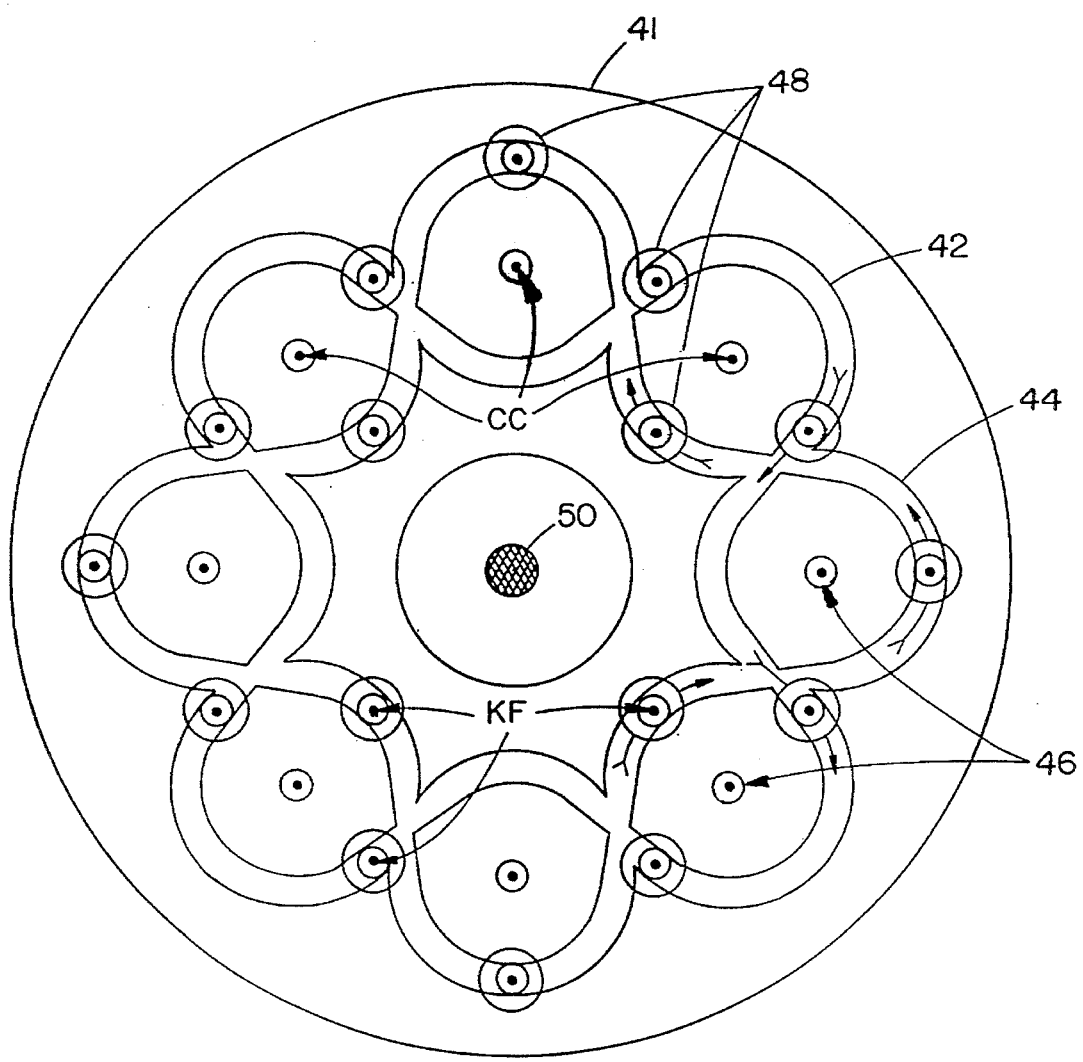
FIG. 4 illustrates a face plate of a braider.

Now returning to FIG. 1, the coated fiber bundles subsequently leave the first cooling bath 30 and enter the rear of a braider 40. The braider 40 comprises a base 43 and a face plate 41 vertically supported by the base. The front of the face plate 41 is shown in FIG. 4. There, two undulating tracks alternatingly pass to the inside and outside of eight center guides 46, which guide the coated carbon fiber bundles CC. On each of the undulating tracks 42, 44, eight Kevlar® fiber cops 48 weave in and out of the eight center guides 46. The eight Kevlar® cops of the first undulating track 42 travel clockwise, whereas the cops on the second track 44 travel counterclockwise.

A weaving mandrel 50 passes concentrically through a center of the face plate 41 being supported as a cantilever upstream of the braider 40 by beam 52, which is supported by the base 43. If the braid reinforced member is to have a solid core, then this weaving mandrel serves as a core for the final braided member. In this embodiment, the core/mandrel 50 is wood or foam continuously supplied upstream of the braider and pulled through a heated die 60 by a cata-puller 90 with the braid reinforced tube woven around it. In the case of the foam core/mandrel 50, it can be alternatively formed by an extruding device continuously upstream of the braider 40.

The coated carbon fiber bundles CC are braided with the dry Kevlar® fiber KF paid out by the cops 48 over the weaving mandrel 50 by the braider 40. The coated carbon fiber bundles of the braided preform BP will make up the unidirectional axial fill reinforcement, and the dry Kevlar® fibers are the bias yarns, which are oriented at plus and minus an angle theta with respect to the coated carbon bundles. At this point, there is little impregnation of the thermoplastic into the carbon fiber bundles. This fact renders the bundles relatively flexible since the individual carbon fibers in the centers of the bundles can still slip over each other. Therefore, the carbon fiber bundles can pass through the angles of curvature necessitated by the braider 40 between the mandrel 50 and the center guides 46.

The angle theta is selected by adjusting the speed of the Kevlar® cops 48 relative to the advancing speed of the braided preform. For maximum torsional rigidity, theta should be 45 degrees. It should be noted that flexibility is available in the selection theta and the mandrel diameter since Kevlar® fibers in most cases are not coated with any thermoplastic. That is, since the carbon fibers run along the axis of the braided preform, they are subject to little or no bending while on the mandrel 50, and consequently, they can carry a thick coating of thermoplastic. In contrast, the Kevlar® fibers wrap around the mandrel 50 with an angle of curvature that is a function of theta and the diameter of the mandrel. The Kevlar® fibers can conform to almost any angle of curvature since at this point they are still dry. Also, the flexibility of the Kevlar® fibers enables faster braider speeds increasing production.

The range of available thicknesses of the thermoplastic coating of the carbon fiber bundles is enhanced by the continuous nature of the production using the instant apparatus. That is, carbon fiber bundles are coated just upstream of the braider 40 so that they need not be stored on spools, for example, that could cause cracking of the thermoplastic coating if it were too thick. Even thicker coatings could be achieved in the present invention by placing the die mandrel 24 in line with the braider 40 ending the need for the roller 51.

Figure 5:
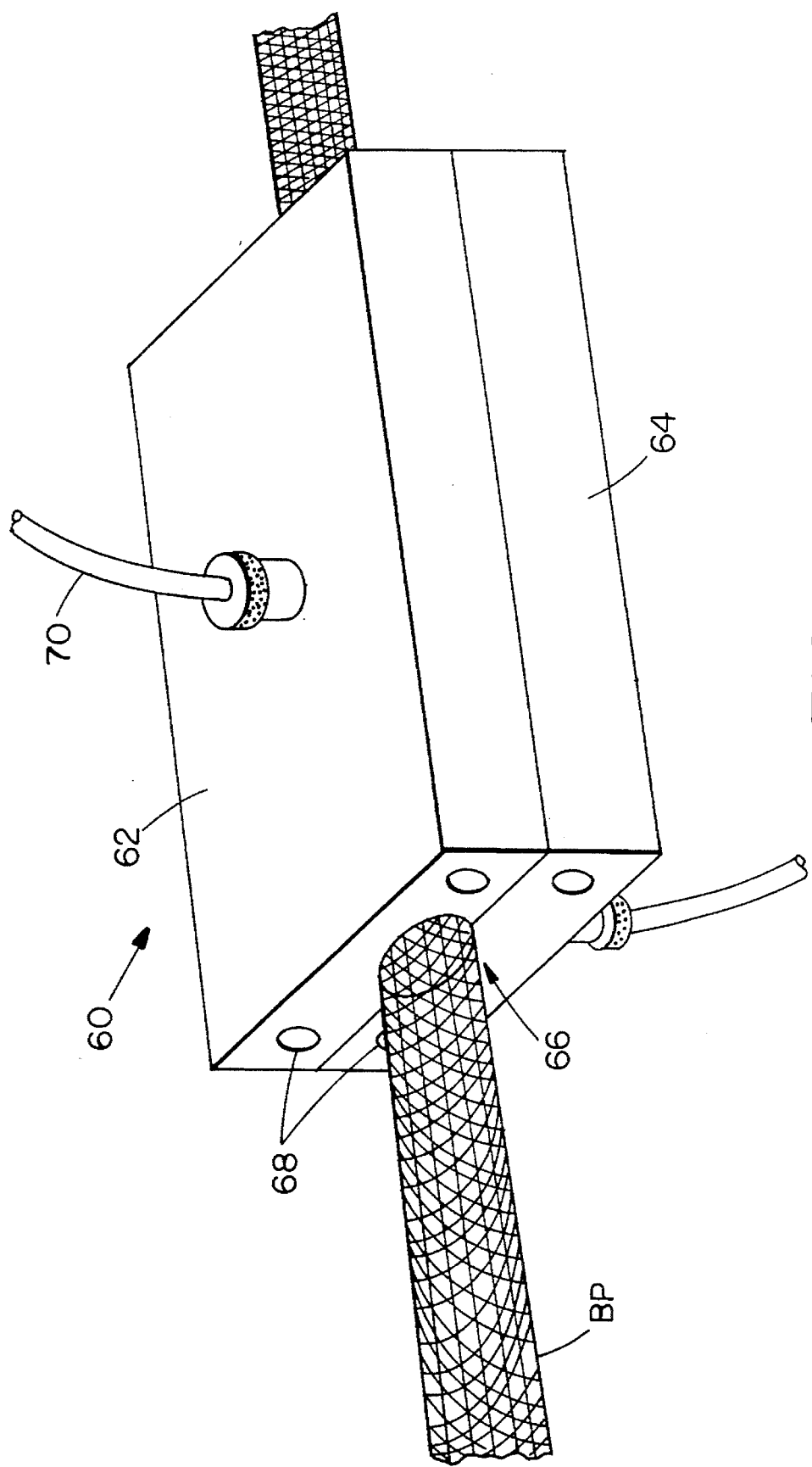
FIG. 5 is a perspective view of a heating die.
Figure 6:
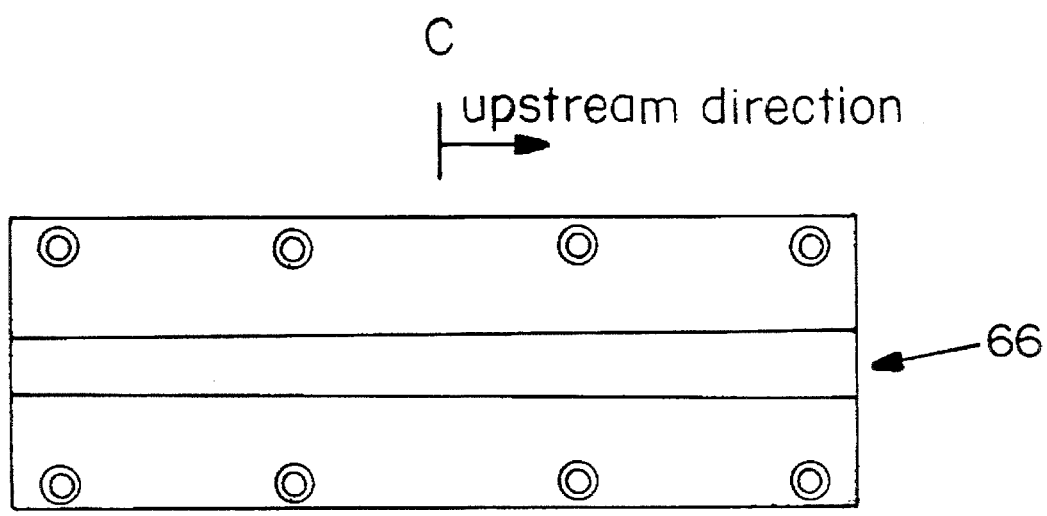
FIG. 6 is a top view of one of the plates of the heating die.

The braided preform BP and the weaving mandrel 50 advance together into a heated die 60, best shown in FIG. 5. The heated die 60 comprises an upper plate 62 sandwiched to a lower plate 64. These plates define a heated die bore 66 through which the braided preform BP and weaving mandrel 50 passes. The die 60 is heated by heater cartridges 68 and the temperature is monitored by thermocouples 70. FIG. 6 shows one of the plates 62 or 64 of the heated die 60. Upstream of a center C of the plate 62, 64, the bore 66 is slightly flared so that it converges around the braided preform BP.

The temperature of the heated die 60 is high enough to melt the thermoplastic coating of the carbon fiber bundles so that it flows in between the individual carbon fibers of each bundle and the previously dry Kevlar® fibers. This effect is accelerated by convergence of the bore 66 so that pressure is developed to ensure adequate impregnation of the fibers by the thermoplastic. Also, the pressure of the converging bore 66 tends to flatten the carbon fiber bundles, which further advances complete impregnation of the bundles.

After exiting the heated die 60, the weaving mandrel 50 and braided fiber member BM enter a second cooling bath 80 directly through a second squeegee water dam 82 to promote even cooling. At this downstream end, the weaving mandrel 50 and braid reinforced member BM are supported by a roller 84 in the second cooling bath 80. The cata-puller 90 provides the required advancing effort to draw the braid reinforced member through the heated die.

Once the braid reinforced member BM has reached the desired length, the member and the weaving mandrel 50 can be appropriately sized. When a solid composite braided reinforced member is desired, the weaving mandrel 50 is retained in the braid reinforced member as a core. This mode would produce structural members with improved resistance to compressive buckling loads. Alternatively, a composite hollow tube can be formed using this method by exposing core to a solvent that will dissolve the core but not harm the tubular member.

Since the advancing braid reinforced member takes on a final shape dictated by the space between the weaving mandrel 50 and the inner surface of the bore 66, member cross-sections other than circular are possible.

Although the invention is described using carbon fibers as axial fiber and Kevlar® as bias fibers other combinations are possible. The properties of the carbon and Kevlar® yield a member that is axially and flexually stiff because of the carbon fibers. The Kevlar® bias fibers give torsionally rigidity. Alternatively, the carbon fibers Kevlar® could be substituted with glass, quartz or oriented polyethylene based upon the desired characteristics of the member. Substitutions could also be made with the polyester thermoplastic such as polyethylene, polyamides or PEEK, or elastomers if more flexibility is desired.

Figure 7:
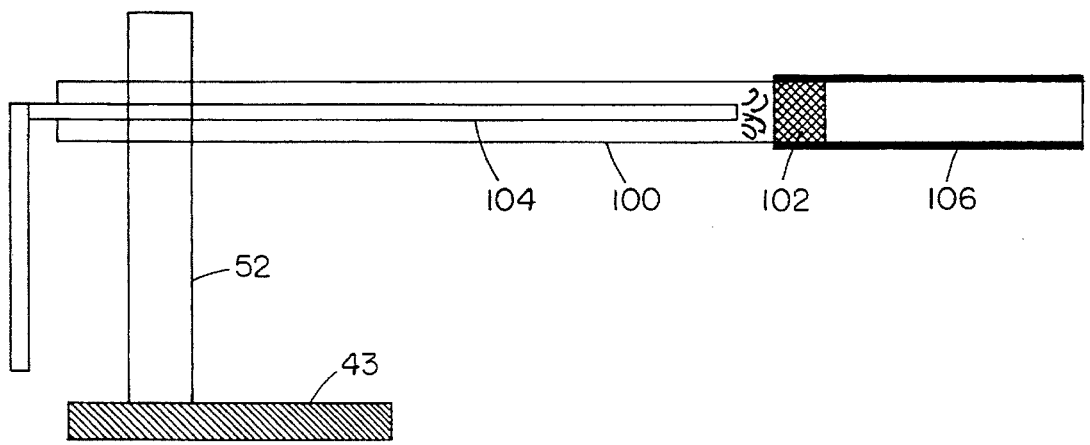
FIG. 7 is a cross-sectional side view of a stationary mandrel used in a first alternative embodiment.

In a first alternative embodiment, a hollow composite woven tube can be directly formed using a stationary mandrel 100 illustrated in FIG. 7 to replace the weaving mandrel 50. Here, the stationary mandrel 100 is cantilevered by the beam 52, upstream of the braider and extending downstream, concentrically through the braider, and through the heated die 60 into the second cooling bath 80. Ideally, the stationary mandrel 100 is formed from a hollow aluminum tube so that from a point just upstream of the heating die 60 to the braider 40, the stationary mandrel is internally cooled. The cooling is required since otherwise the stationary mandrel 100, usually aluminum, will conduct heat in its upstream direction from the heating die 60. This will heat the thermoplastic on the carbon fiber bundles increasing surface tack and thus requiring greater pulling force by the cata-puller 90. The internal cooling is accomplished by placing a silicone stopper plug 102 in the cavity within the stationary mandrel 100 upstream of the heating die 60 and then inserting from the cantilevered end a smaller diameter copper tube 104 for conveying water. A back flow of the water is created back through the mandrel 100 from the silicone plug 102. Downstream of the silicone plug 102 on the outer surface of the mandrel, a PTFE (Teflon) coating 106 is provided on the mandrel all the way to the cooling bath to ensure that the braided preform and finished braided member slide over the stationary mandrel 100.

As an additional technique to decrease the pulling force required by the cata-puller 90, the stationary mandrel can be vibrated so that the coefficient friction between the braid reinforced member and the stationary mandrel tends to the dynamic, rather than the static, coefficient of friction.

Figure 8:
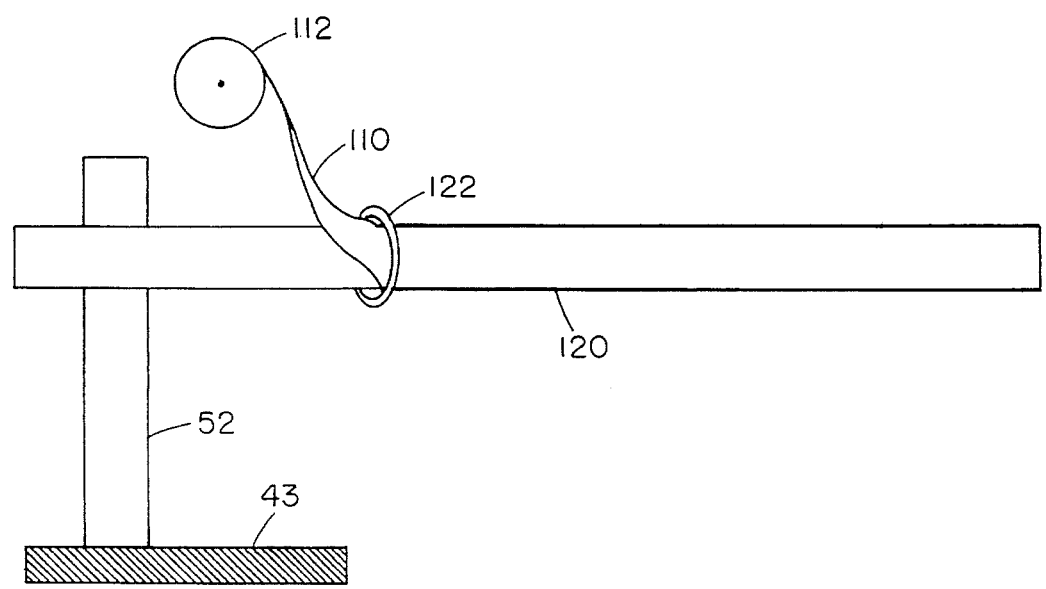
FIG. 8 is a side view of a stationary mandrel used in a second alternative embodiment.

In a second alternative embodiment illustrated in FIG. 8, film 110 from a film pay-off roll 112 is guided onto the outer surface of a stationary mandrel 120 at a point upstream of the braider 40. The film 110 is wrapped around the mandrel 120 by a guide ring 122. The film acts as a barrier between the stationary mandrel 120 and the advancing braided preform that is latter braided over the film.

Figure 9:
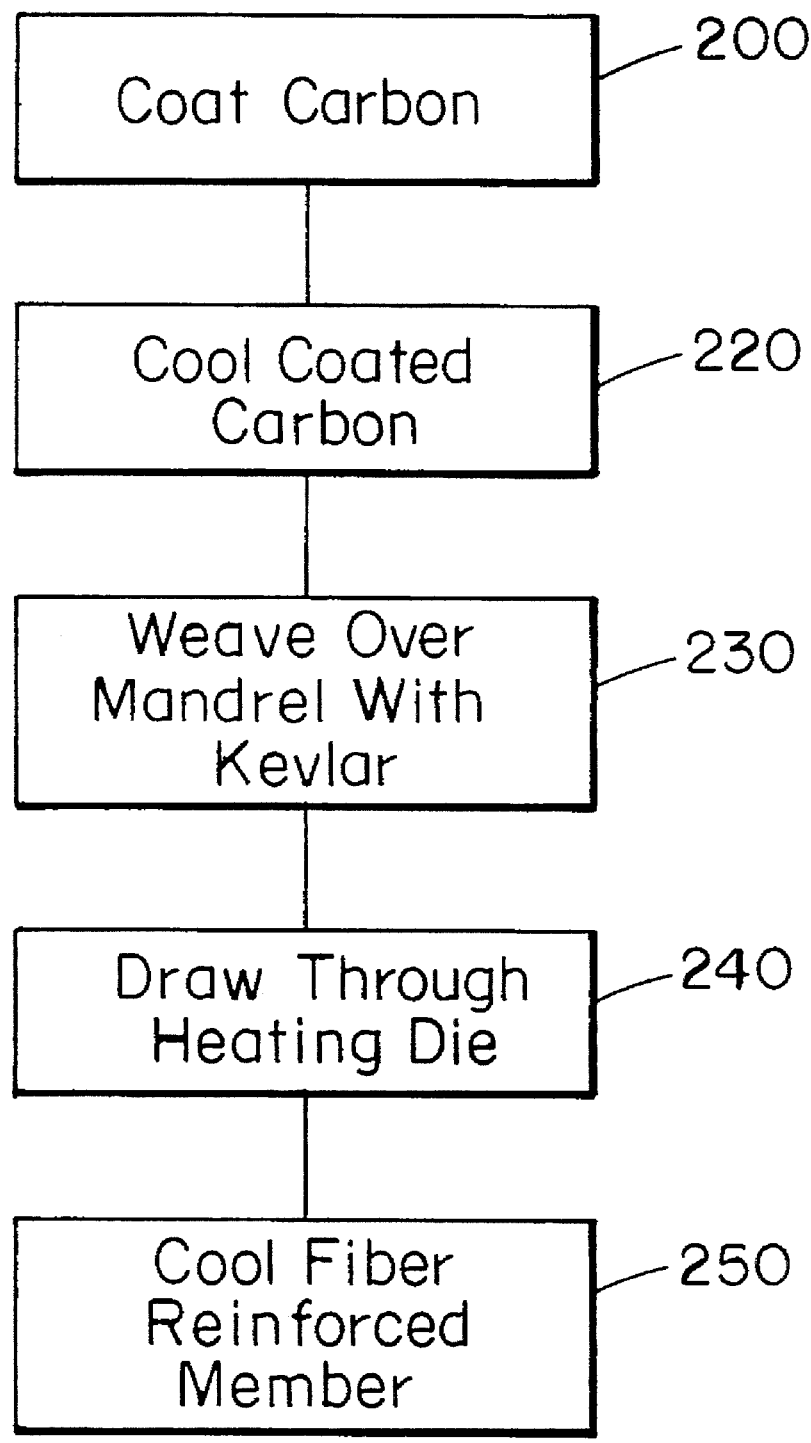
FIG. 9 is a flow diagram for a method for forming a fiber reinforced thermoplastic member.

FIG. 9 is a flow diagram illustrating a method for forming a braided fiber reinforced thermoplastic member. First, in step 200, carbon fiber bundles are drawn through cross-feed extrusion coating dies to coat each of the fibers with a thermoplastic melt. In step 220, the thermoplastic resin melt is cooled in a cooling bath. In subsequent step 230, the coated carbon fiber bundles are woven onto a weaving mandrel along its axis with Kevlar® fibers as bias yarns. The resulting braided preform is then drawn through a heating die which melts the thermoplastic coating on the carbon fiber bundles and forces the melt into and between the Kevlar® and carbon in step 240. In subsequent step 250, the thermoplastic resin of the member is cooled in a second cooling bath to form a continuous matrix of thermoplastic in and around the Kevlar® and carbon fibers while being advanced by a cata-puller device.

Utility

The foregoing-described method and apparatus are useful for forming fiber reinforced braided members which are useful in any application requiring a light weight rigid member such as in aircraft parts.

Equivalents

Those skilled in the art will know or be able to ascertain using no more than routine experimentation, many equivalents to the specific embodiments of the invention described herein.

These and all other equivalents are intended to be encompassed by the following claims.

We claim:

1. Apparatus for forming a braid reinforced thermoplastic member, the apparatus comprising:

a weaving mandrel means for supporting the weaving mandrel such that the weaving mandrel is stationary;

a braiding device for weaving fibers coated with thermoplastic with second fibers onto the weaving mandrel to form a braided preform;

a heating die for melting the thermoplastic of the coated fibers of the braided preform to form a continuous matrix of thermoplastic between the coated fibers and the second fibers to produce the member; and a cooling bath for receiving and cooling the member exiting from the heating die;

wherein the weaving mandrel extends through the heating die and into the cooling bath and includes:

a center bore of the weaving mandrel formed therein, a fluid tube in the bore of the weaving mandrel for conveying a cooling fluid into the mandrel, and a plug, sealing the center bore of the weaving mandrel, for restricting circulation of the cooling fluid from a portion of the mandrel within the heating die.

2. Apparatus as claimed in claim 1, wherein the means for supporting supports the weaving mandrel as a cantilever.

3. Apparatus as claimed in claim 2, wherein the means for supporting supports the mandrel upstream of the braiding device.

4. Apparatus as claimed in claim 2, wherein the mandrel has a low friction outer coating in a portion within the heating die.

5. Apparatus as claimed in claim 2, wherein the mandrel further comprises a film manifold for dispensing a low friction film coating between an outer surface of the mandrel and the braided preform.

6. Apparatus as claimed in claim 1, wherein the mandrel includes low friction coating on an outer surface thereof downstream of the plug.

7. Apparatus for forming a braided fiber reinforced thermoplastic member, the device comprising:

a plurality of coating dies for coating first fibers with a thermoplastic melt to generate coated fibers;

a weaving mandrel means for supporting the weaving mandrel such that the weaving mandrel is stationary;

a braiding device for weaving the coated first fibers with second fibers on the weaving mandrel; and a fusing device for melting the thermoplastic to form a continuous matrix of thermoplastic between the first fibers and the second fibers, the weaving mandrel extending through the fusing device;

wherein the weaving mandrel includes:

a center bore of the weaving mandrel;

a fluid tube in the center bore of the weaving mandrel for conveying a cooling fluid into the mandrel; and a plug, sealing the center bore, for restricting circulation of the cooling fluid from a portion of the mandrel within the fusing device.

8. Apparatus as claimed in claim 7, further comprising a cooling bath for receiving and cooling the coated first fibers exiting from the coating dies.

9. Apparatus as claimed in claim 7, wherein each one of the coating dies comprises:

- a die mandrel having substantially conical down stream end and an axial bore terminating at an apex of the conical downstream end;
- an extrusion die concentrically surrounding the die mandrel having a die orifice downstream of the apex of the die mandrel; and
- an extruder for supplying thermoplastic melt into an annular space between an outer surface of the die mandrel and an inner surface of the extrusion die.

10. Apparatus as claimed in claim 7, further comprising a cooling bath for receiving and cooling the member exiting from the fusing device.

11. Apparatus as claimed in claim 10, wherein the mandrel extends through the fusing device and into the cooling bath.

12. Apparatus as claimed in claim 7, wherein the mandrel includes low friction coating on an outer surface thereof downstream of the plug.

13. Apparatus as claimed in claim 7, further comprising a pulling device for continuously drawing the member through the fusing device and over the mandrel.

* * * * *

UNITED STATES PATENT AND TRADEMARK OFFICE
CERTIFICATE OF CORRECTION

PATENT NO. : 5,468,327

DATED : November 21, 1995

INVENTOR(S) : Andrew Pawlowicz, Craig Douglas, Amad Tayebi and Stephen Orroth

It is certified that error appears in the above-indentified patent and that said Letters Patent is hereby corrected as shown below:

In Claim 1, Column 6, line 11, after "mandrel", insert a semicolon.

In Claim 1, Column 6, line 26, after "a center bore" delete the words, "of the weaving mandrel".

In Claim 7, Column 6, line 52, after "mandrel", insert a semicolon.

In Claim 7, Column 6, line 63, after "a center bore" delete the words "of the weaving mandrel".

Signed and Sealed this

Fifth Day of March, 1996

Attest:

BRUCE LEHMAN

*Attesting Officer*   *Commissioner of Patents and Trademarks*